Patented Dec. 4, 1928.

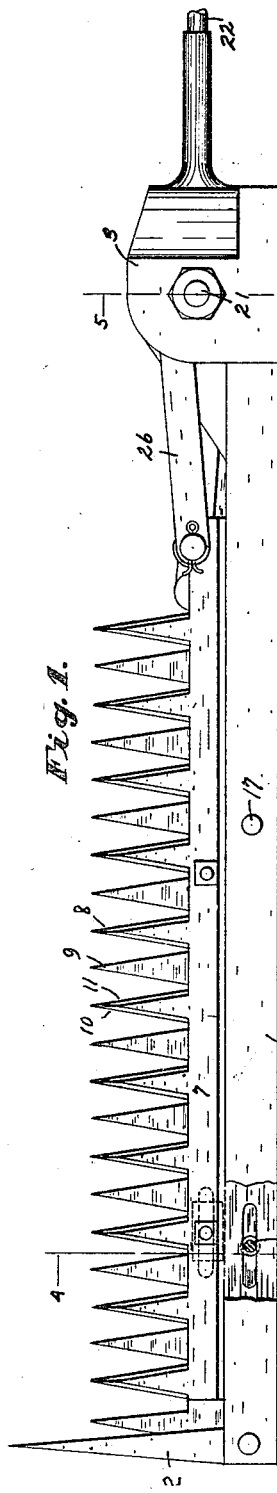

1,693,707

UNITED STATES PATENT OFFICE.

ANTON DISHMAKER, OF KEWAUNEE, WISCONSIN.

CLIPPER.

Application filed August 11, 1927. Serial No. 212,185.

This invention relates to improvements in clippers. The invention will be described hereinafter with particular reference to hedge clippers but it is also adapted for use in all types of clippers including hair clippers and the like.

It is the object of my invention to provide a balanced clipper in which power requirements and vibration are minimized by the provision of blades which move equally in opposite directions.

Manual clipping of ornamental hedges in parks and in private landscape gardens consumes an unnecessary amount of time, but the difficulty of providing mechanism which will not only be light and portable, and therefore easy of operation, and at the same time have power application sufficient to perform the work, has heretofore made it impractical to provide a power clipper.

It is an object, therefore, of my invention to provide a light portable clipper adapted to clip hedges and ornamental shrubbery.

It is a further object of my invention to provide a power driven hedge clipper which will be manually operable at some distance from the source of power or, if designed with motive power integrally with the mechanism, to provide a clipper which may be easily handled by one man with rapidity. It is another object of my invention to provide a hedge clipper which will be rapidly operable and yet steady enough to accomplish a clipping operation with accuracy.

In the drawings:

Figure 1 is a side elevation of my hedge clipper without showing the source of power.

Figure 2 is a vertical view of the clipper shown in Figure 1.

Figure 3 is a view of the opposite side of the hedge clipper shown in Figure 1.

Figure 4 is a sectional view taken on line 4—4 of Figure 1.

Figure 5 is a sectional view taken on line 5—5 of Figure 1.

Like parts are identified by the same reference characters throughout the several views.

Primarily my hedge clipper is built upon a base comprising a channeled bar 1 provided at one end with a stationary elongated sickle tooth 2 and at the other end with vertical ears 3 and 4 comprising means for retaining the driving mechanism of the cutting blades now to be described.

In the channel 5 of bar 1, space for the reception of two sickle bars 6 and 7 is provided. Each of these sickle bars is provided with pointed teeth, such as those at 8 and 9, which face each other and are designed with plane surfaces opposed to each other and sharpened edges at 10 and 11 on either side of each of said sharpened teeth. A bolt at 12 and another at 13 extend through the two sickle bars and, secured by nuts at 14 and 15, respectively, provide means for retaining the two sickle bars in intimate relation so that the surfaces of the cutting teeth will contact closely and function more perfectly in the operation of the completed mechanism.

Each of said sickle bars is designed to reciprocate under the guidance of the walls of the channel 5 in the channel bar 1 and is retained in said channel by means of a pair of studs 16 and 17, respectively.

Enclosed between the ears 3 and 4 at the end of the channel bar 1, I have provided mechanism consisting of a pair of eccentrics 18 and 19 and a bevel gear 20 upon a shaft 21 which, together with a shaft 22 mounted within a boss supported by plate 24 and a bevel pinion 25 attached to shaft 22, provide power connections through pitmen 26 and 27 for reciprocating the two sickle bars 6 and 7.

Any means for supplying rotative power through the shaft 22 will rotate the pinion 25, and therefore the bevel gear 20, and cause the eccentrics to rotate. The pitmen in turn with their bearings about the eccentrics 18 and 19, will therefore reciprocate and cause the sickle bars to reciprocate likewise. It will be noted that the eccentrics 18 and 19 are so constructed as to cause the pitmen to be alternately raised and lowered or forced forward or backward. They do not reciprocate together. By this means, I have provided a balancing action in reciprocating the comparatively heavy members carried by the channel bar 1 with the result that no matter how rapidly shaft 22 may be operated, the stresses and vibrations of the various parts supported by the main channel bar 1 will cancel each other with the result that my completed implement will offer little or no vibration in the hands of an operator.

Ample room is provided along the main bar 1 for a hand hold for the operator and my entire device may be easily carried while in operation and directed along and above the hedge or bush so as to trim it rapidly and accurately according to the design desired.

The stationary tooth 2 at the end of the sickle bar is provided for use when hedges or other shrubbery are situated adjacent a wall or other obstruction, the tooth 2 being adapted to slide against the obstruction and prevent contact of the moving teeth with the wood or stone which might dull them.

Any power shaft or connection which will supply power to the shaft 22 may be used in connection with my device, although I have found it most desirable to use a light weight motor mounted in a bracket secured to the channel bar 1, since it is possible to directly drive from an electric motor which has high speed without danger of excessive vibration.

While the specific description of the invention has been limited to the hedge clipper embodiment shown on the drawings it will be understood that the various features herein described are adapted for a wide variety of uses as above suggested, and may be incorporated practically without change in hair clippers and other forms of clipping or shearing devices employing reciprocable cutters. It will be understood that the two movable blades interconnected for opposite movement, act as counterbalances for each other thereby saving power and minimizing vibration.

I claim:

A hedge clipper of the class described, comprising a channel bar having an elongated stationary blade at its outer end and spaced ears at its inner end, a pair of reciprocating members mounted in said channel bar, said members having cutting toothed blades extending laterally beyond the adjacent edges of said channel bar, means for slidably securing said members to said channel bar, a transversely disposed drive shaft mounted in the ears of said channel bar, means connecting the inner ends of said pitmen to opposite sides of said members to permit the use of both sides of the cutting blades, and means eccentrically connecting the inner ends of said pitmen to said drive shaft at diametrically opposite points whereby simultaneous reciprocating movement in opposite directions is imparted to the cutting blades to maintain them in balanced relation relative to each other.

ANTON DISHMAKER.